US006237228B1

(12) United States Patent
Moody

(10) Patent No.: US 6,237,228 B1
(45) Date of Patent: May 29, 2001

(54) APPARATUS FOR ADJUSTING TIGHTNESS OF A CHAIN SAW CUTTING ELEMENT

(76) Inventor: Andrew Moody, P.O. Box 1624, Chiefland, FL (US) 32644

(*) Notice: Subject to any disclaimer, the term of this patent is extended or adjusted under 35 U.S.C. 154(b) by 0 days.

(21) Appl. No.: 09/358,172

(22) Filed: Jul. 20, 1999

(51) Int. Cl.[7] .................................................... B23D 57/02
(52) U.S. Cl. ................................................ 30/381; 30/386
(58) Field of Search ............................. 30/386, 381, 382, 30/385; 83/816

(56) References Cited

U.S. PATENT DOCUMENTS

| | | | | |
|---|---|---|---|---|
| H294 | * | 7/1987 | Hiraizumi et al. | 30/383 |
| 1,096,529 | * | 5/1914 | Eggleston | 81/177.5 |
| 2,518,755 | * | 5/1950 | Clarke | 81/177.5 |
| 3,216,471 | * | 11/1965 | Wendel | 81/177.5 |
| 3,636,995 | * | 1/1972 | Newman | 144/72 |
| 3,672,419 | * | 6/1972 | Fischer | 81/177.5 |
| 4,117,594 | * | 10/1978 | Arbuckle | 30/381 |
| 4,999,918 | * | 3/1991 | Schiemann et al. | 30/383 |
| 5,345,686 | * | 9/1994 | Zimmermann | 30/383 |
| 5,353,506 | * | 10/1994 | Muller et al. | 30/383 |
| 5,896,670 | * | 4/1999 | Gibson et al. | 30/383 |
| 6,032,373 | * | 3/2000 | Peterson | 30/386 |
| 6,049,986 | * | 4/2000 | Calkins et al. | 30/386 |

* cited by examiner

*Primary Examiner*—Rinaldi I. Rada
*Assistant Examiner*—Omar Flores-Sánchez

(74) *Attorney, Agent, or Firm*—Ronald E. Smith; Smith & Hopen, P.A.

(57) ABSTRACT

A chain saw has a spacer plate that provides an initial clearance space between an outer surface of an elongate flat blade that carries the cutting element of the saw and an inner surface of a recessed wall formed in a motor cover that forms a part of the chain saw housing when a pair of locking nuts are loosely seated against an outer surface of the recessed wall. When the locking nuts are firmly seated, the initial clearance space is reduced to no clearance space and the elongate flat blade is firmly held against vibration, but the light contact between the elongate flat blade and the recessed wall enables the elongate flat blade to be displaced in a first direction to loosen the cutting element and in a second direction, opposite to the first direction, to tighten the cutting element. This eliminates any need to loosen the locking nuts to accomplish cutting element adjustment. The spacer plate extends through an elongate slot formed in the elongate flat blade. The thickness of the spacer plate positions its outer surface above the outer surface of the elongate flat blade by about 0.001 inches. A cut out formed in the spacer plate provides access to a blade position adjustment member, and a tool is provided to engage the blade position adjustment member when the locking nuts are firmly seated against the spacer plate. The tool is permanently engaged to the blade position adjustment member so that the blade position and hence the chain tightness may be adjusted at any time in the absence of delay. The recessed wall is formed of a rigid but compressible material so that the clearance space is eliminated by the tightening of the locking nuts. The spacer plate reduces the amount of compression between the recessed wall and the elongate flat blade so that the elongate flat blade can be adjusted without loosening the locking nuts.

8 Claims, 4 Drawing Sheets

APPARATUS FOR ADJUSTING TIGHTNESS OF A CHAIN SAW CUTTING ELEMENT

BACKGROUND OF THE INVENTION

1. Field of the Invention

This invention relates, generally, to improvements in chain saws. More particularly, it relates to an improvement that enables the chain of a chain saw to be loosened or tightened without requiring loosening of locking nuts that secure a chain-carrying blade of the saw to the motor housing of the saw.

2. Description of the Prior Art

Chain saws include an elongate flat blade having a peripheral edge about which a cutting element, also known as a chain, extends in a continuous, endless loop. The distal free end of the chain is used for cutting. The proximal end of the chain extends around a sprocket gear that engages the chain and causes it to rotate around the peripheral edge of the elongate flat blade when the sprocket gear is rotated. The sprocket gear is attached to the output shaft of a motor means that is housed in a motor housing, and the proximal end of the elongate flat blade is secured to the motor housing.

More specifically, an elongate slot is formed in the proximal end of the elongate flat blade, and a pair of externally threaded post members that are secured to the motor housing respectively extend through the apertures. Each post member has an unthreaded base having a diameter greater than the diameter of the threaded part of the post, and the respective bases are recessed with respect to the elongate slot formed in the elongate flat blade. A pair of internally threaded locking nuts respectively screw threadedly engage the threaded part of the post members and securely lock the elongate flat blade against movement when the nuts are tightly seated. The nuts do not contact the respective base members of the posts due to their recessed position.

A worm gear means is employed as a part of a blade position adjustment means that displaces the elongate flat blade in a first direction to loosen the chain and in a second, opposite direction to tighten the chain. However, when the elongate flat blade is tightly secured against movement by the locking nuts, the blade position adjustment means cannot perform its function because the elongate flat blade cannot be displaced when said locking nuts are firmly seated.

Accordingly, to tighten or loosen the chain, both locking nuts must be loosened. After a tool such as a screw driver is used to manipulate the blade position adjustment means until the chain is loosened or tightened to a desired tautness, the locking nuts must then be tightened again.

It can take several minutes to perform the above-described procedure. The locking nuts are very tight, and must be loosened and re-tightened with a socket wrench or other high torque tool. There are many times, such as when a firefighter is in the field and fighting a fast-moving fire, where a quick loosening or tightening of the chain is imperative. Conventional chain saws, however, are designed as described above and thus do not enable such quick adjustment.

In view of the art considered as a whole at the time the present invention was made, it was not obvious to those of ordinary skill in this art how a chain saw could be modified to enable quick loosening or tightening of the cutting element of the saw with respect to the elongate flat blade around which the cutting element extends.

SUMMARY OF THE INVENTION

The long-standing but heretofore unfulfilled need for an apparatus that overcomes the limitations of the prior art is now met by a new, useful, and nonobvious invention. The present invention includes a chain position adjustment means for enabling adjustment of a chain saw cutting element. A conventional, elongate flat blade has a peripheral edge about which the cutting element extends. The elongate flat blade has a distal free end used for cutting and a proximal end that is slidingly secured to a housing for a motor means that drives the chain about the peripheral edge of the elongate flat blade when the saw is activated. An elongate slot is formed in the proximal end of the elongate flat blade and extends completely therethrough. A pair of longitudinally spaced apart, externally threaded post members are mounted to the motor means housing. The posts have threaded parts that extend through the elongate slot formed in the proximal end of the elongate flat blade and unthreaded bases of greater diameter than the threaded parts. The respective bases are recessed with respect to the elongate slot formed in the proximal end of the elongate flat blade.

A blade position adjustment means is rotatably mounted to the motor housing and includes a peg means, driven by a worm gear, for displacing the elongate flat blade in a distal-to-proximal direction to loosen the cutting element and to displace the elongate flat blade in a proximal-to-distal direction for tightening the cutting element. The elongate slot formed in the flat blade means in registration with the peg means accommodates the distal-to-proximal and proximal-to-distal displacement of the elongate flat blade.

A spacer plate having a predetermined thickness has a longitudinal extent sized to fit within the elongate slot. The spacer plate is apertured at its opposite ends and sits atop shoulders formed at the juncture of the threaded posts and their respective unthreaded bases.

The spacer plate also has a cut-out formed in it, mid-length thereof, to provide access to the blade position adjustment means.

The predetermined thickness of the spacer plate positions an external or away-from-the motor housing surface thereof above an external or away-from-the motor housing surface of the elongate flat blade. A clearance space is therefore provided between the external or away-from-the motor housing surface of the spacer plate and the internal or facing-the-motor housing surface of the elongate flat blade when locking nuts are respectively loosely screw-threadedly engaged with the externally threaded posts. The nuts cause the internal or motor housing-facing side of a motor housing cover to seat lightly against the spacer plate and not against the proximal end of the elongate flat blade when the nuts are loosely tightened.

In the prior art, when firmly seated the nuts cause the internal or motor housing-facing side of the motor housing cover to seat tightly against the external or away-from-the motor housing surface of the proximal end of the elongate flat blade because the respective bases of the nuts are recessed with respect to the elongate slot formed in said proximal end. Thus, there is nothing to prevent the nuts from driving the internal, motor housing-facing surface of the motor housing cover into tightly abutting relation to the external, away-from-the motor housing surface of said proximal end.

In the novel assembly, the spacer plate provides a clearance space between the inner surface of the motor housing cover and the outer surface of the elongate flat blade when the nuts are loosely tightened, as aforesaid. However, when the nuts are firmly tightened, the clearance space disappears due to the compressability of the facing-the-motor housing side of the motor housing cover, it being understood that said cover is formed of a high impact plastic. The internal or facing-the-motor housing side of the motor housing cover therefore abuts the proximal end of the elongate flat blade. However, the presence of the spacer plate prevents the abutting contact from being firm. The amount of contact is sufficient to prevent vibration of the blade, but not enough to prevent adjustment of the blade position by using a blade position adjustment tool in a well-known standard way. The light abutting contact thus enables displacement of the elongate flat blade by the blade position adjustment means to loosen or tighten the cutting element with respect to the peripheral edge of the elongate flat blade even when the nuts are tightly seated.

It is a primary object of this invention to enable adjustment of a chain saw chain even when the locking nuts of a chain saw are firmly seated.

In other words, it is the primary object of this invention to provide the first chain saw having a chain adjustment means that does not require loosening of locking nuts prior to adjustment of the chain.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
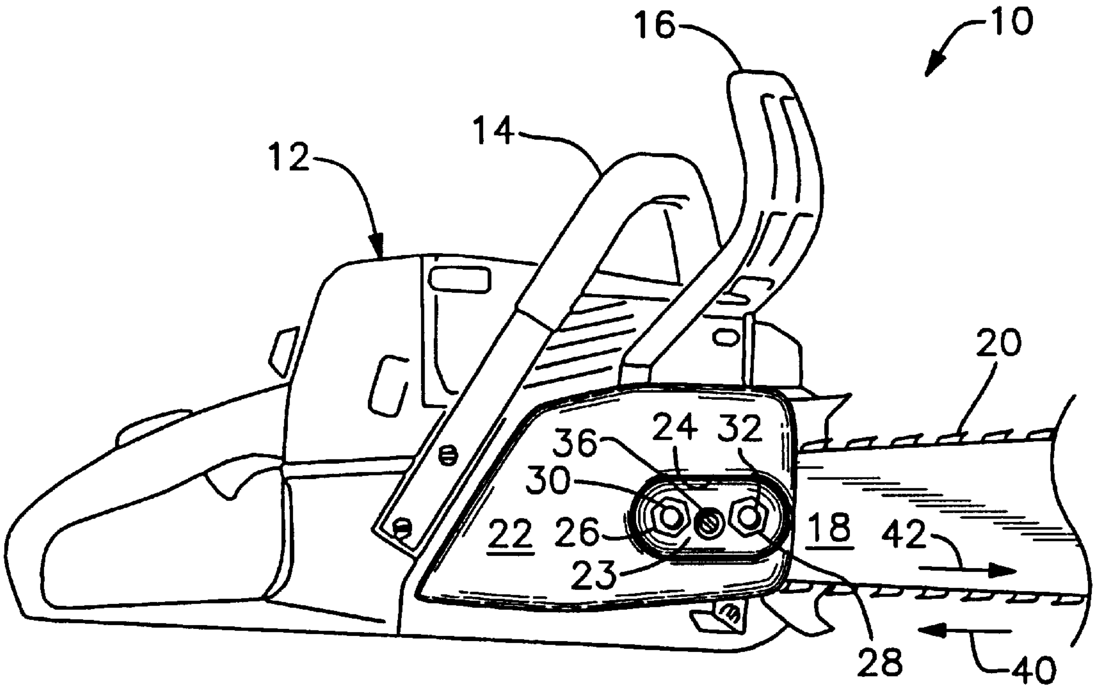
Fig. 1 Prior Art
FIG. 1 is a side elevational view of a chain saw of the prior art.

Referring now to FIG. 1, it will there be seen that a chain saw of the prior art is denoted as a whole by the reference numeral 10.

Chain saw 10 includes a motor housing 12, a handle 14, a safety shield 16, a chain saw blade 18 of elongate, flat construction and an endless chain 20 that extends around the perimeter of said blade 18 in a well-known way. Cover 22 covers the proximal end of blade 18 and chain 20 for safety reasons. Cover 22 is recessed as at 24 to provide clearance for a pair of internally threaded nuts 26, 28 and recessed wall 23 has suitable openings formed therein to receive a pair of externally threaded posts 30, 32 that extend from motor housing 12. Another opening is formed in recessed wall 23, substantially centrally thereof, and accommodates a slotted, tool-engageable, rotatable adjustment screw 36, sometimes hereinafter referred to as a blade position adjustment means. When adjustment screw 36 is rotated in a first direction, such as a counterclockwise direction, it causes a worm gear, not shown, to displace a peg, not shown in FIG. 1, that is connected to chain saw blade 18, in a distal-to-proximal direction as indicated by single-headed directional arrow 40. Such motion of said blade 18 loosens chain 20 relative to blade 18. When said screw 36 is rotated in a clockwise direction, it displaces the unillustrated peg and chain saw blade 18 in a proximal-to-distal direction, as indicated by directional arrow 42. Such displacement tightens chain 20 relative to blade 18.

Significantly, when nuts 26, 28 are tightened, they bear directly against recessed wall 23 and the inboard or motor housing-facing side of said recessed wall bears directly against the outboard or away-from-the motor housing surface of the elongate flat blade 18 and locks it against movement. Thus, adjustment screw 36 cannot be rotated when said nuts are tight and therefore chain 20 can neither be tightened nor loosened. It follows that to introduce slack into an overly tight chain, or to tighten an overly slack chain, the user must find a first tool to loosen nuts 26, 28, find a second tool to engage adjustment screw 36, perform the adjustment with the second tool, re-tighten the nuts with the first tool, and return the first and second tools to their respective storage locations. This well-known procedure usually takes about five minutes; that can be an unacceptably long time in emergency situations.

Figure 2:
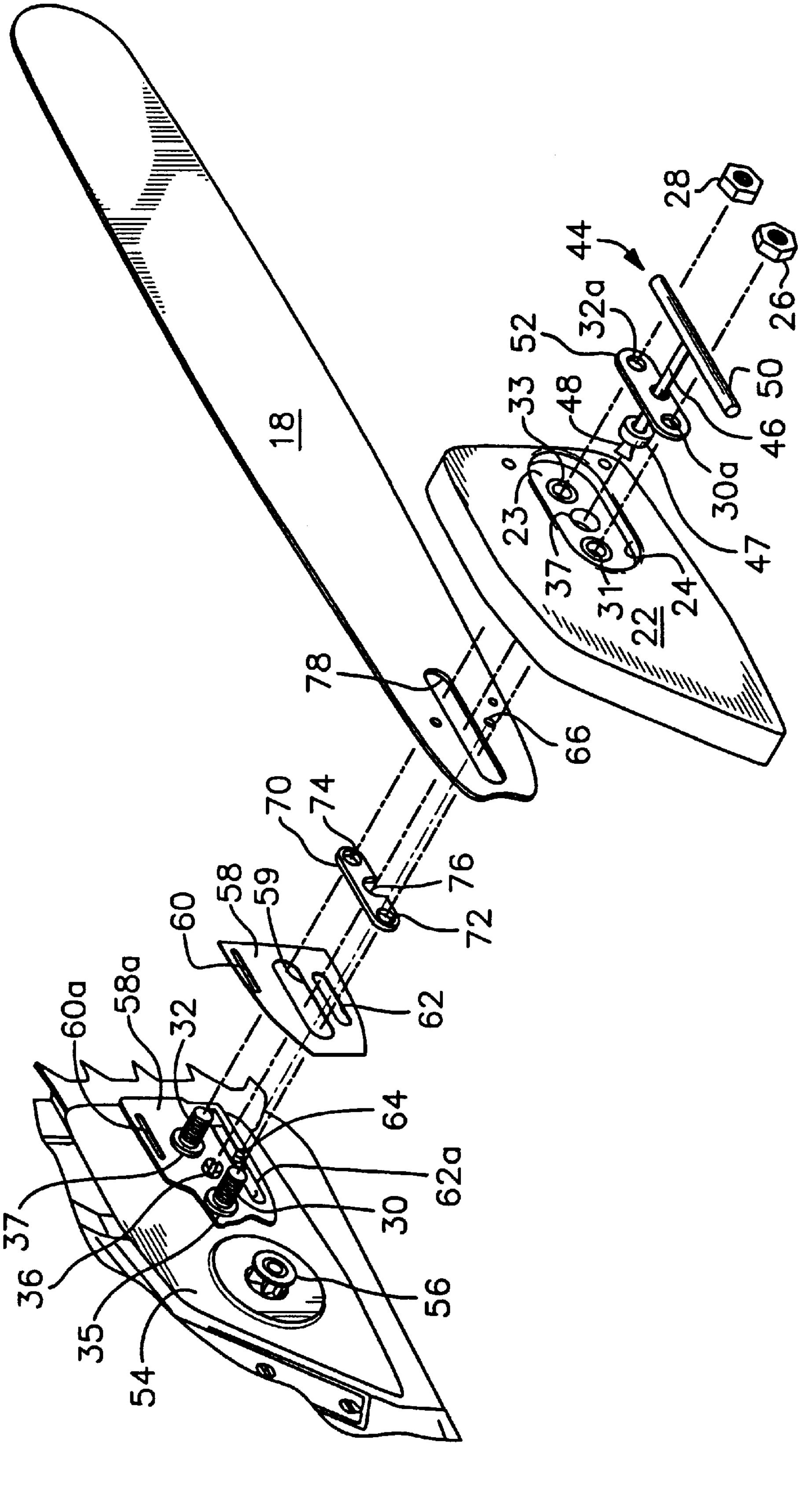
FIG. 2 is an exploded perspective view of the novel improvement to chain saws.

An improvement to the well-known prior art structure of FIG. 1 is depicted in FIG. 2; the improvement enables the chain to be slackened or tightened without loosening locking nuts 26, 28 from their tightly seated configuration. Thus, the prior art step of locating a first tool to loosen the nuts and using said first tool to re-tighten the nuts after chain adjustment is eliminated. Moreover, the new design permanently attaches an adjustment screw rotating tool to the novel assembly so that it is always available to engage adjustment screw 36 as needed.

The openings formed in recessed wall 23 of motor housing cover 22 for receiving posts 30, 32 are denoted 31, 33 in FIG. 2, and the opening formed in recessed wall 23 for providing access to adjustment screw 36 is denoted 37. Cover 22 and recessed wall 23 are formed of a rigid but slightly compressible material such as a high impact plastic.

The tool that is permanently attached to the novel assembly is denoted 44 as a whole; it includes shank 46 having a flared free end 48 that engages the slot in adjustment screw 36 at all times when the inventive assembly is assembled and a handle 50 that is comfortably gripped by a human hand and rotated counterclockwise or clockwise when the chain is to be loosened or tightened, respectively.

Bushing 47 is permanently attached to shank 46; said bushing occupies access opening 37 and aligns tool 44 with adjustment screw 36. Handle 50 is transversely disposed relative to shank 46; accordingly, tool 44 is hereinafter sometimes referred to as T-handle 44.

Figure 3:
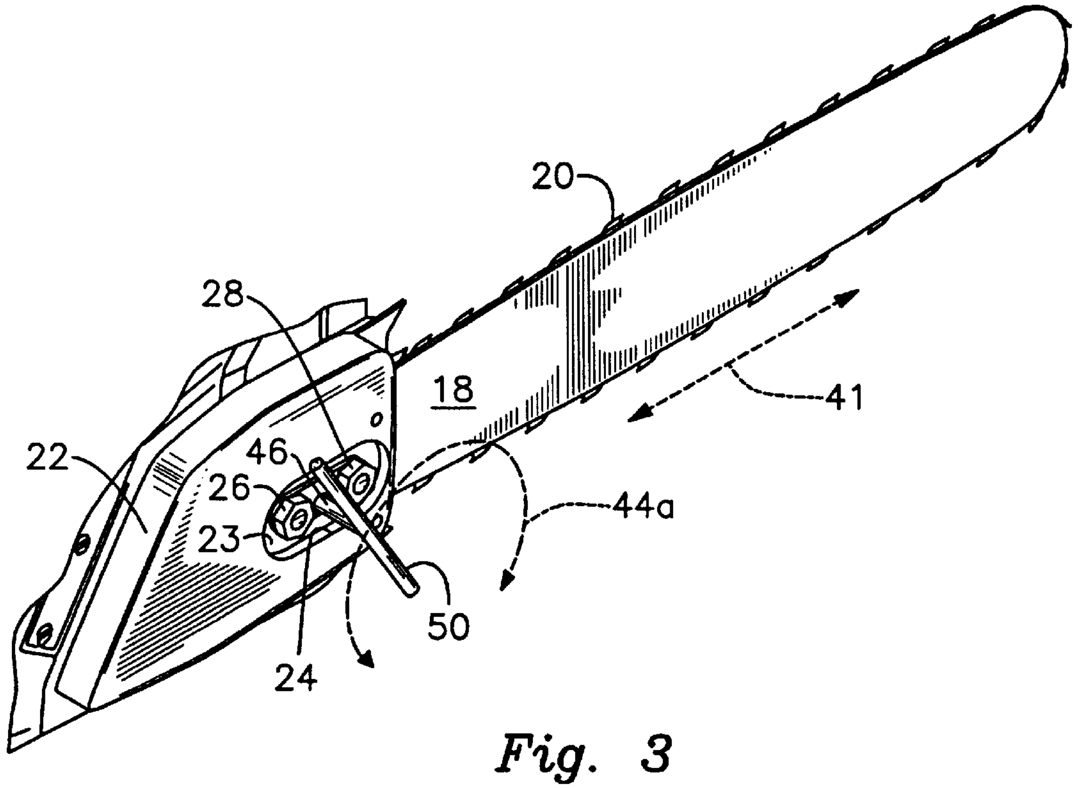
FIG. 3 is a perspective view depicting how the chain of the novel chain saw is loosened or tightened.
Figure 6:
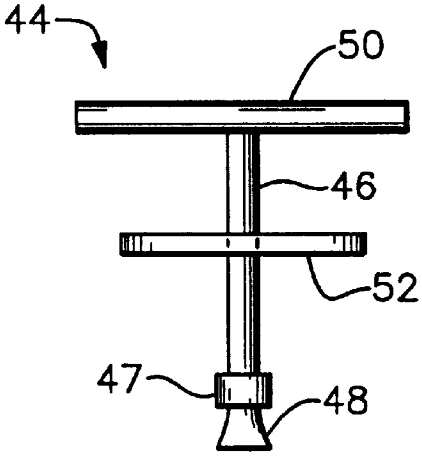
FIG. 6 is a side elevational view of the novel tool when extending through a conventional washer plate.

T-handle 44 is also depicted in FIGS. 3 and 6. FIG. 3 includes straight double-headed directional arrow 41 that indicates both directions 40 and 42 and arcuate double-headed directional arrow 44*a* depicting the counterclockwise and clockwise turning of said T-handle.

Figure 7:
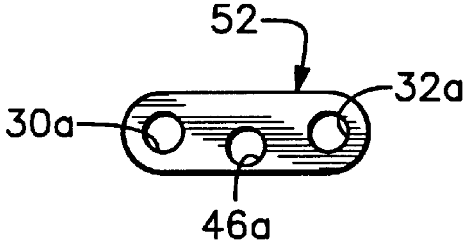
FIG. 7 is a side elevational view of the conventional washer plate depicted in FIG. 6.

Shank 46 extends through a central aperture (denoted 46*a* in FIG. 7) formed in washer plate 52; the diameter of the central aperture is less than the breadth of flared end 48 so that said flared end cannot be withdrawn through said central aperture, thereby ensuring that T-handle 44 cannot be separated from saw 10.

Apertures 30*a,* 32*a* are formed in each end of washer plate 52 to receive posts 30, 32, respectively. When nuts 26, 28 are firmly tightened onto posts 30, 32, respectively, said nuts bear against washer plate 52 as is apparent from the exploded view of FIG. 2.

Significantly, however, when said nuts are firmly tightened, the internal or motor housing-facing side of recessed wall 23 bears lightly against elongate flat blade 18 and tightly against novel spacer plate 70. Accordingly, the blade is held against vibration when the saw is operating but its position can still be adjusted without requiring loosening of the nuts.

In FIG. 2, the area of motor housing 12 that is covered by cover 22 is denoted 54. A rotatably mounted drive gear 56 projects laterally from said motor housing. Said drive gear is driven by the output shaft of the chain saw motor, not shown, and is engaged in driving relation to the proximal end of chain 20 in a well-known way.

Figure 4:
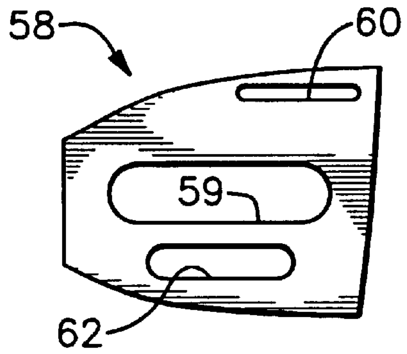
FIG. 4 is a side elevational view of a flat support plate that forms a part of the novel assembly.

Flat support plate 58, also depicted in FIG. 4, overlies raised support surface 58*a* of motor housing 54, said raised support surface being integral with the motor housing and being shaped to support flat support plate 58. Elongate aperture 59 is formed in flat support plate 58 to accommodate posts 30, 32 and adjustment screw 36. Elongate slot 60*a,* formed in the upper end of raised support surface 58*a,* is a conventional oil opening that forms a part of the lubrication system of the chain saw, and forms no part, per se, of the present invention. Elongate slot 60, formed in flat support plate 58, is in registration with said slot 60*a* when chain saw 10 is in its assembled configuration, said slot being required as a part of said lubrication system.

Elongate slot 62*a,* formed in a lower end of said raised support surface 58*a,* accommodates peg 64 that is displaced along the length of said slot 62*a,* depending upon the direction of adjustment screw 36 rotation. Elongate slot 62, formed in flat plate 58, is in substantial registration with elongate slot 62*a* and also accommodates movement of said peg 64.

The free end of peg 64 extends snugly through opening 66 formed in the proximal end of chain saw blade 18; accordingly, travel of peg 64 in a distal-to-proximal direction displaces blade 18 in the direction of arrow 40 (FIG. 1), thereby loosening chain 20, and travel of peg 64 in a proximal-to-distal direction displaces said blade 18 in the direction of arrow 42 (FIG. 1), thereby tightening said chain. The worm gear assembly that translates rotation of adjustment screw 36 into longitudinal travel of peg 64 is not shown; said worm gear assembly, which includes peg 64, is a part of the prior art and thus forms no part of the invention, per se. However, it is important to understand that displacement of said peg 64 by said worm gear assembly carries chain saw blade 18 and that locking of nuts 26, 28 in a prior art chain saw effectively prevents movement of said peg 64 by firmly clamping the proximal end of chain saw blade 18 between flat plate 58 and the motor housing-facing (inboard) side of recessed wall 23 so that adjustment screw 36 cannot be rotated, thereby preventing movement of the worm gear assembly that displaces peg 64.

Figure 5:
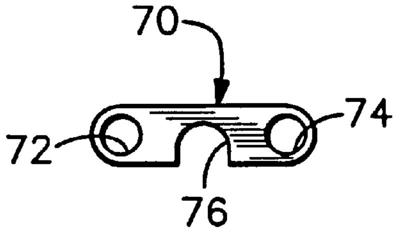
FIG. 5 is a side elevational view of the novel spacer plate.

In the novel assembly of this invention, chain saw blade 18 is free to be displaced by peg 64 as adjustment screw 36 is rotated by tool 44, even when nuts 26, 28 are firmly tightened to their respective posts 30, 32. The part that enables this movement is spacer plate 70 (also depicted in FIG. 5). Apertures 72, 74 are formed in its opposite ends to receive posts 30, 32, respectively, and a cut-out area 76 is formed mid-length thereof, in open communication with a bottom edge thereof, to accommodate adjustment screw 36 and shank 46 of adjustment tool 44.

Each post 30, 32 has a base 35, 37, respectively, formed integrally therewith. Each base 35, 37 is unthreaded and projects outwardly from raised surface 58*a* and has a diameter greater than the diameters of threaded posts 30, 32, respectively. When posts 30, 32 extend through apertures 72, 74, respectively, the inboard or motor housing-facing side of spacer plate 70 seats squarely against said bases 35, 37, i.e., the juncture of the threaded posts and their respective unthreaded bases creates a shoulder that supports the spacer plate at its opposite ends.

In a commercial embodiment of the invention, having utility with a Stihl® chainsaw, model 039, the thickness of flat blade 18 is greater than the thickness (vertical extent) of bases 35, 37 by about 0.074 inches. In other words, when the proximal end of flat blade 18 overlies motor housing 54, the respective outboard or away-from-the-motor housing surfaces of bases 35, 37 are recessed from the outboard or away-from-the-motor housing surface of flat blade 18 by about 0.074 inches. Flat blade 18 is about 0.180 inches thick, so the height of bases 35, 37 is about 0.106 inches (0.180 less 0.074). In the preferred embodiment of this invention, spacer plate 70 has a thickness of about 0.076 inches. Since spacer plate 70 is supported at its opposite ends by bases 35, 37, which are recessed by 0.074 inches as aforesaid, the outer or away-from-the motor housing side of spacer plate 70 projects about 0.002 inches beyond the outboard or away-from-the motor housing surface of flat blade 18. A projection greater than 0.002 inch will allow vibration of flat blade 18, but a projection as small as 0.001 inches or even 0.0001 inch or smaller will still work, depending upon the compressibility of the material out of which motor housing cover recessed wall 23 is made.

When supported at its opposite ends by said bases 35, 37, the away-from-the-motor housing side of spacer plate 70 projects through elongate slot 78 formed in the proximal end of elongate flat blade 18. Said away-from-the motor housing (outboard) side faces the viewer in FIG. 2. Said side extends outwardly from slot 78 by only the width of a human hair, i.e., about one or two thousandths of an inch as just mentioned. Accordingly, tightening nuts 26, 28 causes the (inboard) or motor housing-facing side of recessed wall 23 to seat firmly against the outboard or away-from-the-motor housing side of spacer plate 70 and lightly against elongate flat blade 18. In this way, rotation of adjustment screw 36 by T-handle 44 causes longitudinal travel of peg 64 and hence of chainsaw blade 18. The clearance between the away-from-the-motor-housing (outboard) surface of chain saw blade 18 and the away-from-the-motor-housing (outboard) surface of spacer plate 70 may be as small as the breadth of a human hair as aforesaid. If the spacing is 0.002 inches, no clearance space exists between the away-from-the motor housing (outboard) surface of blade 18 and the motor-housing-facing (inboard) side of recessed wall 23, but the pressure of the contact is light so that said blade is free to move under the influence of peg 64 when adjustment screw 36 is rotated by rotation of T-handle 44, even where nuts 26, 28 are firmly tightened.

Spacer plate 70 may thus be thought of as a compression-reducer or a compression reducing means. By projecting about 0.0001 to 0.002 inches above the plane of elongate cutting blade 18, it creates an initial clearance space between the away-from-the motor housing (outboard) surface of blade 18 and the facing-the-motor housing (inboard) surface of recessed wall 23. Tightening nuts 26, 28 compresses the material out of which recessed wall 23 is made, thereby eliminating the initial clearance space and allowing the facing-the-motor housing (inboard) side of the recessed wall to lightly contact the away-from-the motor housing (outboard) side of elongate flat blade 18 to inhibit vibration thereof during chain saw operation. The thickness of spacer plate 70, however, ensures that the contact is sufficiently light to enable manipulation of the blade position adjustment means without first requiring loosening of nuts 26, 28.

In this way, a firefighter can be on the move and still loosen or tighten chain 20 as needed by rotating T-handle 44 counterclockwise or clockwise, respectively. Flared end 48 of T-handle 44 is always engaged with adjustment screw 36 and the needed adjustment is made in the complete absence of loosening and re-tightening screws 26, 28 as in the prior art. This improvement significantly enhances the value of the chain saw.

There are at least two other ways to achieve the desired clearance space, and both of them could be accomplished without using spacer plate 70. First, bases 35, 37 could be manufactured so that they have a vertical extent about 0.075 or 0.076 inches greater than their current extent. Such construction would position their away-from-the motor housing (outboard) surfaces about 0.001 or 0.002 inches, respectively, above the away-from-the motor housing surface of flat blade 18 when nuts 26, 28 are tightened. Secondly, a spacer having a thickness of about 0.075 or 0.076 inches could be placed at the bottom of each base 35, 37. That would have the same effect as lengthening the bases so that they would extend 0.001 or 0.002 inches above the outer surface of elongate flat blade 18. It follows that references in the claims to a spacer plate means includes such obvious equivalents.

The use of spacer plate 70 is preferred because it allows retrofitting to an existing chain saw. Obviously, a chain saw manufactured to have bases with away-from-the-motor housing (outboard) surfaces that extend about 0.001 or 0.002 inches beyond the away-from-the motor housing surface of a flat blade is within the scope of the invention. Although 0.002 inches is believed to be an uppermost limit to the amount of clearance required, the lowermost limit is believed to be as low as 0.0001 inches, and possibly even lower. For this reason, the spacing of about 0.001 inches that appears in the claims should be interpreted liberally to include spacings between about 0.0001 inches to 0.002 inches.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A device for enabling adjustment of a chain saw cutting element, comprising:

a motor housing for housing a chain saw motor;

a motor housing cover formed of a rigid, compressible material;

said motor housing cover having an inboard side facing said motor housing;

an elongate flat blade having a peripheral edge about which said cutting element extends;

said elongate flat blade having an inboard side facing said motor housing and an outboard side facing said motor housing cover;

said elongate flat blade having a distal free end used for cutting and a proximal end that is movably secured to said motor housing;

an elongate slot formed in said proximal end of said elongate flat blade, said elongate slot extending completely through said flat blade;

a pair of longitudinally spaced apart posts mounted to said motor housing that extend through said elongate slot;

each of said posts having an externally threaded part and an unthreaded base having a greater diameter than said threaded part;

a shoulder means formed at the juncture of said threaded part and said unthreaded base of each of said posts;

a blade position adjustment means rotatably mounted to said motor housing;

a peg means movably mounted to said motor housing for distal-to-proximal and proximal-to-distal displacement, said peg means being under the control of said blade position adjustment means;

said peg means engaging the proximal end of said elongate flat blade for displacing said elongate flat blade in a distal-to-proximal direction to loosen said cutting element and in a proximal-to-distal direction to tighten said cutting element;

said elongate slot formed in said elongate flat blade being in registration with said peg means to accommodate said distal-to-proximal and proximal-to-distal displacement of said elongate flat blade;

a spacer plate means having apertures formed in its opposite ends for receiving said respective threaded parts of said posts;

said spacer plate means having an inboard side facing said motor housing and an outboard side facing said motor housing cover;

said spacer plate means being supported at its opposite ends by said respective unthreaded bases of said posts;

said spacer plate means having a longitudinal extent sized to fit within said elongate slot;

said spacer plate means having a cut-out formed therein to provide access to said blade position adjustment means;

said respective bases of said posts being recessed by a predetermined distance with respect to said outboard side of said elongate flat blade;

said spacer plate means having a predetermined thickness that positions its outboard side about 0.001 inches above said outboard side of said elongate flat blade;

a pair of nuts for respectively screw-threadedly engaging said respective threaded parts of said posts;

said pair of nuts, when loosely tightened, urging said inboard side of said motor housing cover into abutting relation to said outboard side of said spacer plate means;

said spacer plate means creating an initial clearance space of about 0.001 inches between said outboard side of said elongate flat blade and said outboard side of said spacer plate means when said pair of nuts are respectively loosely screw-threadedly engaged with said posts;

said initial clearance space being reduced to no clearance space when said nuts are tightened, said tightening compressing said cover of said motor housing so that said inboard side of said motor housing cover lightly abuts said outboard side of said elongate flat blade to prevent vibration of said elongate flat blade during chainsaw operation;

said elongate flat blade being displaceable by said blade position adjustment means to loosen or tighten said cutting element with respect to said peripheral edge of said elongate flat blade when said nuts are tightened because said light abutting contact between said motor housing cover and said elongate flat blade is insufficient to prevent displacement of said elongate cutting blade by said blade position adjustment means.

2. The device of claim 1, further comprising:

a tool for rotating said blade position adjustment means;

said tool including a shank;

said tool including an engagement means at a free end of said shank for engaging said blade position adjustment means; and said tool including a handle that is transversely disposed relative to said shank to facilitate manual rotation of said shank.

3. The device of claim 2, further comprising:

a raised support surface integrally formed in said motor housing;

said respective bases of said posts projecting outwardly with respect to said raised support surface;

a flat support plate that overlies said raised support surface;

an elongate slot formed in said flat support plate;

said elongate slot being sized to accommodate said respective bases of said posts so that an inboard of said flat support plate abuttingly overlies said raised support surface.

4. The device of claim 3, further comprising:

a recessed wall formed in said motor housing cover;

a pair of apertures formed in said recessed wall for receiving said threaded parts of said respective posts;

said recessed wall having an inboard side and an opposite, outboard side;

said inboard side of said recessed wall abutting said outboard side of said spacer plate means when said nuts are lightly tightened in bearing relation to said outboard side of said recessed wall;

said initial clearance space being between said outboard side of said elongate cutting blade and said inboard side of said recessed wall when said nuts are loosely tightened.

5. The device of claim 4, further comprising:

an access opening formed in said recessed wall, said access opening being disposed between said pair of apertures;

a bushing permanently attached to said shank; and said bushing disposed in said access opening to align said shank with said adjustment screw.

6. The device of claim 4, further comprising:

a washer plate having apertures formed in its opposite ends for receiving said threaded parts of said respective posts;

said washer plate overlying said outboard side of said recessed wall; and said nuts abutting against said washer plate when fully tightened to said posts.

7. The device of claim 6, further comprising:

a central aperture formed in said washer plate; and said shank of said tool extending through said central aperture.

8. The device of claim 7, further comprising:

said engagement means at said free end of said shank being flared and having a breadth greater than a breadth of said central aperture so that it cannot be retracted through said central aperture, thereby preventing separation of said tool and said blade position adjustment means.

* * * * *